US007720826B2

(12) United States Patent
Fitzer et al.

(10) Patent No.: US 7,720,826 B2
(45) Date of Patent: May 18, 2010

(54) PERFORMING A QUERY FOR A RULE IN A DATABASE

(75) Inventors: Joachim Fitzer, Schriesheim (DE); Klaus-Peter Lang, Brackenheim (DE)

(73) Assignee: SAP AG, Walldorf (DE)

( * ) Notice: Subject to any disclaimer, the term of this patent is extended or adjusted under 35 U.S.C. 154(b) by 343 days.

(21) Appl. No.: 11/618,402

(22) Filed: Dec. 29, 2006

(65) Prior Publication Data

US 2008/0162473 A1 Jul. 3, 2008

(51) Int. Cl.
*G06F 19/00* (2006.01)
(52) U.S. Cl. .................. 707/694; 707/754; 707/758; 707/773; 707/953
(58) Field of Classification Search .................. None
See application file for complete search history.

(56) References Cited

U.S. PATENT DOCUMENTS

| | | | | |
|---|---|---|---|---|
| 6,144,958 | A * | 11/2000 | Ortega et al. ..................... 707/5 |
| 6,169,986 | B1 * | 1/2001 | Bowman et al. ................ 707/5 |
| 6,401,084 | B1 * | 6/2002 | Ortega et al. ..................... 707/2 |
| 6,751,611 | B2 * | 6/2004 | Krupin et al. ................... 707/3 |
| 2002/0095405 | A1 * | 7/2002 | Fujiwara ........................ 707/3 |
| 2002/0103787 | A1 * | 8/2002 | Goel et al. ...................... 707/3 |
| 2002/0129033 | A1 * | 9/2002 | Hoxie et al. ................. 707/101 |
| 2003/0069877 | A1 * | 4/2003 | Grefenstette et al. ............ 707/2 |
| 2003/0110165 | A1 * | 6/2003 | Selgas et al. .................... 707/3 |
| 2004/0138988 | A1 * | 7/2004 | Munro et al. ................. 705/37 |
| 2004/0205050 | A1 * | 10/2004 | Stevens et al. .................. 707/3 |
| 2005/0076010 | A1 * | 4/2005 | Bass et al. ...................... 707/3 |
| 2005/0154722 | A1 * | 7/2005 | Seitz et al. ...................... 707/3 |
| 2005/0177552 | A1 * | 8/2005 | Bass et al. ...................... 707/3 |
| 2005/0182758 | A1 * | 8/2005 | Seitz et al. ...................... 707/3 |
| 2005/0203883 | A1 * | 9/2005 | Farrett ............................ 707/3 |
| 2005/0210020 | A1 * | 9/2005 | Gunn et al. ..................... 707/3 |
| 2006/0095370 | A1 * | 5/2006 | Seth et al. ..................... 705/40 |
| 2006/0167851 | A1 * | 7/2006 | Ivanov .......................... 707/3 |
| 2006/0212441 | A1 * | 9/2006 | Tang et al. ..................... 707/5 |
| 2006/0265391 | A1 * | 11/2006 | Posner et al. ................ 707/10 |
| 2007/0073667 | A1 * | 3/2007 | Chung ........................... 707/3 |
| 2007/0185862 | A1 * | 8/2007 | Budzik et al. .................. 707/5 |
| 2008/0162427 | A1 * | 7/2008 | Connearney et al. ........... 707/3 |

OTHER PUBLICATIONS

SAP AG, "Display IMG," CRM 5.0 Implementation Guide.
SAP AG, "Change View "Determination of Pricing Procedure": Overview" CRM 5.0.

* cited by examiner

*Primary Examiner*—Charles Rones
*Assistant Examiner*—Kurt Mueller
(74) *Attorney, Agent, or Firm*—Fish & Richardson P.C.

(57) ABSTRACT

In a database whose entries contain values organized in categories, a first query is performed that includes input query values respectively associated with at least some of the categories and that seeks entries whose values match each input query value. Upon finding no entries, a category whose input query value to eliminate is identified. A second query is performed that includes the input query values except for the identified at least one category. The second query seeks any of the entries whose values match each of the input query values of the second query and that has no specified value for the identified at least one category. A data structure is configured to indicate an order that at least some of several categories will be eliminated when generating a new query after a previous query does not result in a match among entries of a database.

18 Claims, 6 Drawing Sheets

| Configuration Table | | | | | | |
|---|---|---|---|---|---|---|
| Query-Variable_1 | Query-Variable_2 | ... | Query-Variable_j | Query-Variable_k | ... | Query-Variable_Z |
| qav1 | qav2 | ... | qavj | qavk | ... | qavz |
| qbv1 | qbv2 | ... | qbvj | qbvk | ... | * |
| * | qcv2 | ... | qcvj | qcvk | ... | qcvz |
| * | * | ... | * | * | ... | * |

FIG. 1

FINConfigTab — 200

| Company | Customer Group | Business Partner | Configuration Bundle |
|---|---|---|---|
| * | * | * | CB1 |
| BASF | G1 | * | CB2 |
| * | G2 | * | CB3 |

206a, 206b, 206c — 204

Metadata Table — 202

| Config TableName | Fieldname | Sequence GroupNumber | Sequence Number |
|---|---|---|---|
| FINConfigTab | Company | 1 | 1 |
| FINConfigTab | Company | 2 | 2 |
| FINConfigTab | Customer Group | 2 | 1 |
| FINConfigTab | Business Partner | 1 | 0 |

| Class Builder: Class CL_JOE_CFG_FIN_ASTERISK Display ||
|---|---|
| Parameter | Type spec |
| IV_COMPANY | TYPE IF_JOE_CFG_FINCONFIGTAB=>TY_S_DATA-COMPANY |
| IV_CUSTOMER_GROUP | TYPE IF_JOE_CFG_FINCONFIGTAB=>TY_S_DATA-CUSTOMER_GROUP |
| IV_BUSINESS_PARTNER | TYPE IF_JOE_CFG_FINCONFIGTAB=>TY_S_DATA-CUSTOMER_PARTNER |
| VALUE(RS_ENTRY) | TYPE IF_JOE_CFG_FINCONFIGTAB=>TY_S_DATA |
| CX_CONFIG_KEY_NOT_FOUND | |
| Method  GET_ENTRY | Active |

```
METHOD get_entry;
******************Process group #1***************************
    SELECT SINGLE * FROM zfinconfigtab INTO rs_entry
        WHERE  company         = iv_company
        AND    customer_group  = '*'
        AND    business_partner = iv_business_partner
    IF sy-subrc = 0
    * entry was found => exit
        EXIT
    ENDIF
    SELECT SINGLE * FROM zfinconfigtab INTO rs_entry
        WHERE  company         = '*'
        AND    customer_group  = '*'
        AND    business_partner = iv_business_partner
    IF sy-subrc = 0
    * entry was found => exit
        EXIT
    ENDIF
******************Process group #2***************************
    SELECT SINGLE * FROM zfinconfigtab INTO rs_entry
        WHERE  company         = iv_company
        AND    customer_group  = iv_customer_group
        AND    business_partner = '*'
    IF sy-subrc = 0
    * entry was found => exit
        EXIT
    ENDIF
    SELECT SINGLE * FROM zfinconfigtab INTO rs_entry
        WHERE  company         = iv_company
        AND    customer_group  = '*'
        AND    business_partner = '*'
    IF sy-subrc = 0
    * entry was found => exit
        EXIT
    ENDIF
    SELECT SINGLE * FROM zfinconfigtab INTO rs_entry
        WHERE  company         = '*'
        AND    customer_group  = '*'
        AND    business_partner = '*'
    IF sy-subrc = 0
    * entry was found => exit
        EXIT
    ENDIF
    * no entry found => raise exception
    RAISE EXCEPTION TYPE cx_config_key_not_found
ENDMETHOD
```

FIG. 5

PERFORMING A QUERY FOR A RULE IN A DATABASE

TECHNICAL FIELD

This document relates to database querying.

BACKGROUND

In many computer systems there is a need to evaluate rules at different times, for example at application runtime. Sometimes, rule evaluation can be done by querying a rule database with one or more specific input values and, upon finding that one of the rules matches the value(s), performing an action implicated by the identified rule. The rules that are to be applied in a system are sometimes referred to as a business configuration. In business configurations it is sometimes desired to determine a special behavior which is valid for a number of queries that can be very different from each other. In other words, there are a number of possible scenarios that can involve unique values of a variety of variables that should all lead to the same outcome when applying the rule(s). For example, systems from SAP AG have included "Rule Engines", "Context Finder" or "Formula and Derivation" Tools to be used in performing these types of queries. One challenge when creating systems that are to perform querying using this or other types of configuration is that the concrete query or queries may not be available at the time the function for the query is defined.

SUMMARY

In a first aspect, a computer-implemented method for performing a query in a database includes performing, in a database whose entries contain values organized in categories, a first query that includes input query values respectively associated with at least some of the categories. The first query seeks any of the entries whose values match each of the input query values. The method includes identifying, upon no such entries being found, at least one of the categories for which to eliminate the associated input query value from the first query. The method includes performing a second query in the database that includes the input query values except for the identified at least one category. The second query seeks any of the entries whose values match each of the input query values of the second query and that has no specified value for the identified at least one category.

Implementations can include any, all or none of the following features. The input query values for the first query can be identified in a query value elimination from a previous query that did not result in a match. The query value elimination can be done by identifying at least one category that was involved in the previous query. The at least one category can be identified by accessing a sequence record indicating an order in which to eliminate at least some of the categories. The sequence record can contain an indication that at least one of the categories is not to be subject to the elimination. The sequence record can define category groups that are to be processed in order until a match is found. The indication can be included in each of the category groups except a last category group. When a last category group is being processed, the method can further include generating a last query by eliminating a last one of the categories. The last query can seek any of the entries that has no specified value for any of the categories. The method can further include receiving, before performing the first query, an overall group of values. The method can further include identifying the input query values in the overall group for use in the first query based on a predefined assignment of the input query values to a first group. The method can further include identifying at least another one of the categories with which at least another input query value in the overall group is associated. The at least one other input query value can have a predefined assignment to a second group. The method can further include generating the first query so that it seeks any of the entries whose values match each of the input query values and that has no specified value for the at least one other category identified for the second group. Successive queries for the input query values of the first group can be performed, interspersed with at least one category elimination, without a match being found, and the method can further include processing the other input query values of the second group in a corresponding way until a match is found. Each of the entries can correspond to a rule and can be associated with an action. The method can further include performing the associated action upon finding a match to any of the queries. The queries can be performed on at least one configuration table in the database, and the entries can be rows in the configuration table.

In a second aspect, a computer program product is tangibly embodied in an information carrier and includes a data structure. The data structure is configured to indicate an order that at least some of several categories will be eliminated when generating a new query after a previous query does not result in a match among entries of a database. The previous query sought any of the entries whose values match each of several input query values. The elimination comprises that the new query will seek any of the entries whose values match each of the input query values except for the identified at least one category and that has no specified value for the identified at least one category.

Implementations can include any, all or none of the following features. The data structure can define category groups that are to be processed in order until a match is found. During the processing of one of the category groups the categories in any currently not processed category group can be eliminated. The data structure can further contain an indication that at least one of the categories is not to be subject to the elimination. The data structure can define category groups that are to be processed in order until a match is found, and the indication can be included in each of the category groups except a last category group. Each of the entries can correspond to a rule and can be associated with an action that can be performed. The associated action can be performed upon finding a match to any of the queries. The queries can be performed on at least one configuration table in the database, and the entries can be rows in the configuration table.

Implementations can provide any, all or none of the following advantages: Providing an improved evaluation of business configuration settings. Providing an improved way of querying a database. Providing an improved approach for eliminating one or more input query values to revise a query that does not yield a match. Providing an evaluation approach for configuration settings that reduces the necessary number of database entries. Providing an evaluation approach for configuration settings that requires less maintenance effort for rule definition. Providing an evaluation approach for configuration settings that captures dynamic values.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 1 shows an example of a database table that can be queried.

FIG. 2 shows another example of a database table and a metadata table.

FIG. 5 shows an example of access coding that can be used in querying a database.

Like reference symbols in the various drawings indicate like elements.

DETAILED DESCRIPTION

Figure 3:
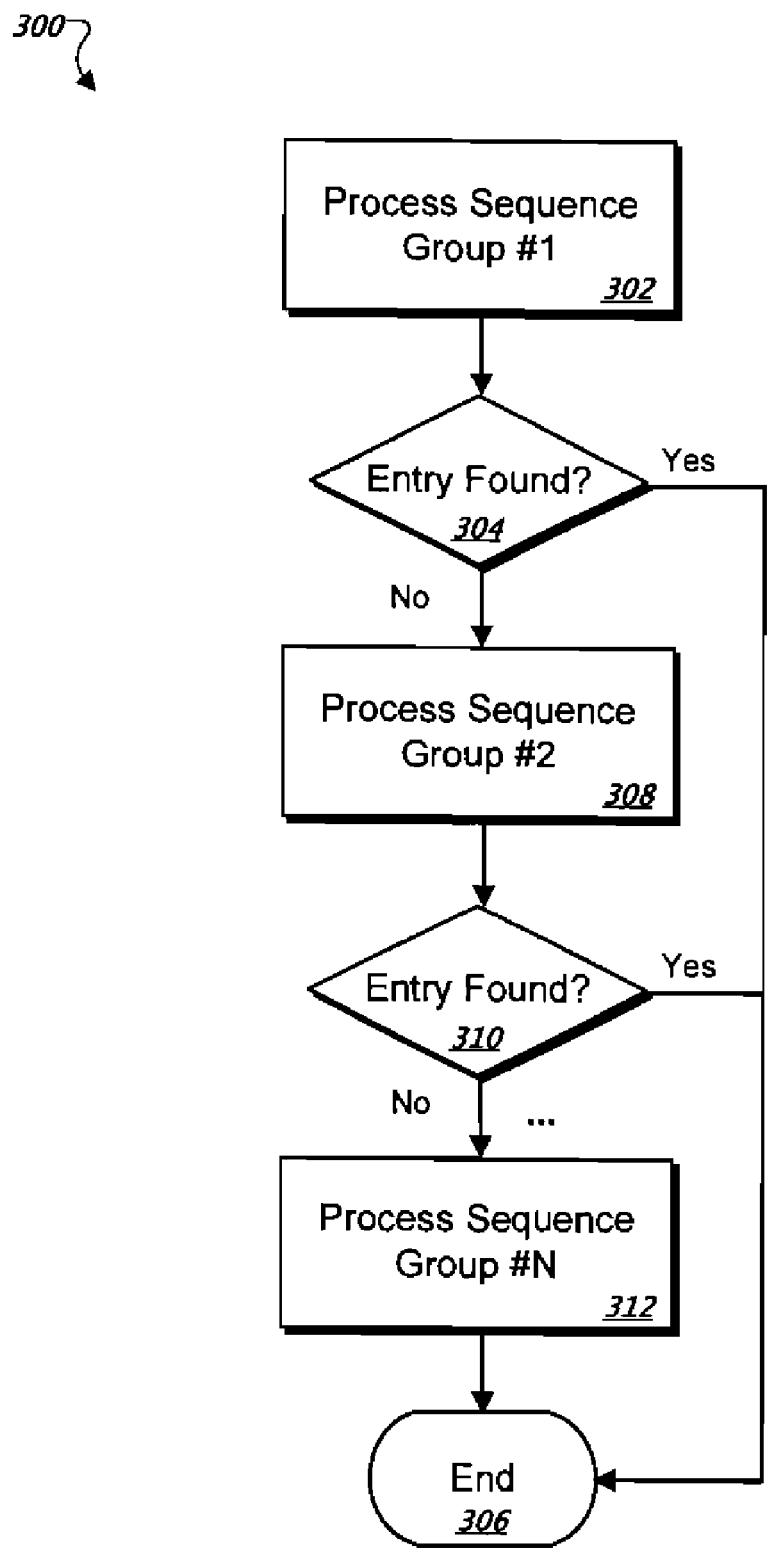
FIG. 3 shows an example of a method that can be performed on sequence groups.

FIG. 1 shows an example of a database table 100 that can be queried. Particularly, there can be performed one or more queries on the database table to determine whether any of its entries match the one or more criteria set forth in the query. If a particular query finds no match, the query can be revised according to a predefined schema to form a new query. This process can be repeated one or more times. In some implementations, the query can be made more general in several successive iterations, until it finally becomes a default query that is predetermined to match at least a default database entry.

The database table 100 includes categories 102 that are used in attributing a meaning to certain information entered in the table. Here, the categories are represented as columns in the table, and these columns are named Query-Variable1, QueryVariable2, . . . Query-Variablej, Query-Variablek, . . . and Query-VariableZ. One or more columns of the table have been omitted for clarity. Thus, the table 100 is here assumed to contain individual columns numbered from 1 to an arbitrary number that is here represented by "Z", wherein only two of the columns (j and k) that are intermediate the beginning and end of the row of columns are explicitly shown.

The database table 100 here contains four rows 104a-d. Each of the rows can be considered a entry in the database table. The database table can be queried for some or all content of the rows. For example, each row can correspond to an object in a computer system. In some implementations, one or more of the categories is considered a primary key, and the table can then be sorted based on the values that the respective entries have for the primary-key category or categories. In other implementations the table may have more or fewer rows than shown here.

The rows have positions for each of the respective columns, and such a position can either be filled with a value or with an indicator that has a predefined meaning. Here, a first row 104a has the value qav1 for the category Query-Variable1, the value qavz for the category Query-Variable2, and so on, until the last value, which is the value qavz for the category Query-VariableZ. For example, assume that the row 104a has a specified value for each of the categories 102. In some implementations, this can mean that only a query that requires each of these particular values for the corresponding categories will find the row 104a as a search result. That is, the row 104a in such an implementation would be found only if the query specified each one of the input query values: qav1, qav2, . . . , qavj, qavk, . . . and finally qavz, because it was here assumed that the row 104a contains specific values for the intermediate categories.

The row 104b, in contrast, uses a special indicator in at least one of its fields. Beginning from the left, the row 104b here contains specific values in its fields, similar to the way the row 104a had them. That is, the row 104b has the value qbv1 for the category Query-Variable1, the value qbv2 for the category Query-Variable2, and so on. However, the row 104b in this example does not contain a specific value in at least one field 106, the one for the category Query-VariableZ. Rather, the field 106 is here shown as containing the character "*", known as an asterisk. In some implementations, the asterisk is interpreted as meaning that the corresponding entry does not specify a particular value for the field or fields containing the character(s). For example, the field 106 in this implementation can signify that the row 104b is valid for (or applies to) queries that do specify each of the other values (i.e., the values qav1, qav2, . . . , qavj, qavk, . . . ) except the last value. The asterisk character is only an example, and in other implementations there can be used another character, string, symbol, or indicator to signify that the particular entry is not dependent on a specific value for the corresponding category. In some implementations, the indication can be that the field has nothing entered in it or is initial. For clarity, the term "asterisk" will be used in this description.

Each row can have anywhere from zero asterisks to the number of asterisks that there are categories. For example, the row 104c has an asterisk in the Query-Variable1 column, which can signify that this row matches any query that contains the other values of the row (e.g., qcv2, . . . , qcvj, and so on) and that does not specify a value for the first category.

The row 104d, in turn, contains several asterisks. Particularly, asterisks are here shown in the fields of the row 104d for each of the categories Query-Variable1, QueryVariable 2, . . . . Query-Variablej, Query-Variablek, . . . and Query-VariableZ. Assume, for example, that the row 104d indeed contains all asterisks; that is, for each of the categories 102, the corresponding field in the row 104d contains an asterisk and does not specify a value. In some implementations, this can be considered the most generic of all entries in the table, because it applies only to a query that explicitly does not specify a value for any of the categories. For example, an "all asterisks" entry can be a default entry and similarly, an "all asterisks" query can be a default query. In some implementations, the default query can be reached when successive revisions of an initial query, such as by using a predefined schema, have not yielded any hits in the database. By revising the query to the default query, which is designed to seek out and find the default entry, the iterative querying approach can come to an end.

When one or more entries in the database table 100 match the query, this can prompt some action in the system. For example, the rows 104 can be associated with respective information that indicates the action(s) to perform for each one of the rows when such a row matches a query. The action information can be stored in a column 108 of the table, or outside of the table, to name a few examples. For example, it can be specified that a particular action is to be performed if the row 104a matches the query, and another action (or no action) is to be performed if the row 104b is found. In some implementations, then, it can make a significant difference whether the query finds the row 104a or the row 104b. Also, in such implementations, whether the row 104a or the row 104b is found can depend on the order that respective portions of the queries are subject to revision, among other factors. For example, the order in which query components are revised can be defined in meta information that is accessed as the one or more queries are performed.

FIG. 2 shows another example of a database table 200 and a metadata table 204. In this example, the table 200 is to be queried using one or more input query values. If such a query does not find a match in the table 200, the query can be revised according to the definitions in the metadata table 202. Here, the table 200 is a configuration table, sometimes referred to as a determination table. For example, a configuration table can be used in a computer system to make one or more decisions based on at least one input value. That is, the table can be queried once or more until a match is found, and the obtained match will decide an action to perform (or not to perform) in response to the input value(s).

Here, the table 200 relates to a financial application program (FIN), such as a financial application that can be used in a computer system configured to perform enterprise resource planning (ERP) operations. Particularly, the table 200 here includes a column 204 labeled "Configuration Bundle" that can be the outcome when any of the table entries matches a query. That is, each of the configuration bundles can define what action to perform (or not to perform) when the query finds the corresponding entry.

Assume now that the FIN table relates to the actions to perform, or strategies to follow, when a customer's invoice becomes overdue. For example, a company may want to consider one or more of the following approaches for an overdue invoice: Doing nothing, at least for another 30 days; sending a reminder invoice; or having a sales representative get in touch with a contact at the buyer. These are merely examples, and many other action or approaches are possible. In the table 200, then, each of the configuration bundles in the column 204 can correspond to a respective approach to use. Moreover, the company may want to dynamically choose between the several approaches to speed up the processing, eliminate undue influence, and ensure a consistent approach. As will be described in the following, the metadata table 202 can be used in performing one or more queries on the table 200. In some implementations, the metadata table 202 can be a record that defines a sequence for eliminating one or more input query values.

Here, the table 200 includes three categories: Company, Customer Group and Business Partner. For example, the Company category can relate to the name of the delinquent organization; Customer Group to the particular area of business to which the transaction relates (for example, if the same customer makes purchases in more than one group); and Business Partner to a consultant involved in the transaction. In other implementations, more or fewer columns can be included in the table 200. Particularly, these categories may have been selected by the selling company because they are the most relevant drivers—or influencing factors—for that company to handle overdue invoices. Other categories, then, and more or fewer categories, can be used in other implementations.

In this example, the table 200 includes three rows 206a-c. Here, the row 206a has asterisks in each of its three fields, which in some implementations makes it the default query. The row 206b, in contrast, contains the value "BASF" in the Company category, the value "G1" in the Customer Group category, and an asterisk in the Business Partner category. The row 206c, in turn, contains the value "G2" in the Customer Group category and asterisks in the other two fields. The rows 206a-c are associated with respective configuration bundles CB1, CB2 and CB3. For example, the configuration bundles correspond to separate approaches for handling an overdue invoice. More or fewer rows may be used in other implementations.

Assume now that the situation is as follows. A particular customer Company X is late on paying an invoice. This transaction relates to customer group G2 and it involves Consultant Y. Thus, the input query values are Company X, G2, and Consultant Y. In some implementations, these values can be obtained dynamically. For example, an accounting application program that monitors invoice payments can dynamically provide one or more relevant values (here Company X, G2, and Consultant Y) so that a determination can be made how to handle a particular overdue invoice.

In one implementation, the first query that is performed on the table 200 uses all of the specified input query values. That is, the table 200 may be queried for an entry that has the values Company X, G2, and Consultant Y in the respective categories. Here, no such entry exists in the table 200. In one implementation, the metadata table 202 can then be used to determine how to revise the query that gave no result.

The metadata table 202 includes columns 208-214 in this example. The column 208 is a configuration table name column that indicates the one or more configuration tables that this metadata relates to. Here, the entries in the column 208 indicate the database table 200. The column 210 indicates the names of fields that occur in the database table referred to in the column 208. Here, those field names correspond to the categories shown in the database table 200. In some implementations, this means that each of the rows in the metadata table 202, rows 216a-d in this example, corresponds to one or more categories in the database table. Here, the entries in the column 210 indicate that each of the rows 216a and 216b relates to the Company category; the row 216c to the Customer Group category; and the row 216d to the Business Partner category.

The columns 212 and 214 can be used to indicate the sequencing to be applied to the respective input query values. The column 212 can indicate that one or more of the input query values belongs to a sequencing group. Here, the Customer Group category belongs to a group "2" (row 216c) and the Business Partner category belongs to a group "1" (row 216d). The Company category, in turn belongs to both group 1 (row 216a) and group 2 (row 216b). For example, when the metadata table 202 is used for eliminating one or more input query values when a query is being modified, the value(s) in group 1 can be processed first, without regard to the value(s) in group 2, and only if that processing does not lead to a match will the value(s) in group 2 be processed.

The column 214 can be used to indicate an order associated with a particular value. For example, when the values are organized in groups, the column 214 can indicate the sequence of processing the individual values with each of the groups. In other implementations where groups are not used, the column 214 can indicate a global sequencing of values. Here, beginning with group 2 (rows 216b and 216c), the column 214 indicates that within this group the Customer Group category has sequence number 1 and the Company category has sequence number 2. In some implementations, this means that if input query values are eliminated in the processing, the value for the Customer Group category will be eliminated first, and the value for the Company category will be eliminated next. More numbers than shown here can be used.

Next, for the group 1 (rows 216a and 216d), the column 214 indicates that the Company category has sequence number 1 and the Business Partner category has sequence number 0. The sequence number 1 can have the same significance as it does for group 2: That this input query value is the first one that should be eliminated if the query is to be revised. The sequence number 0 can have a special meaning. For example, the sequence number 0 can mean that for any category or categories labeled with this number, the corresponding input query values do not participate in the elimination process. In some implementations, this can mean that these values are to remain in a query also when it is being revised.

For example, the querying of the database table 200 in this example can run as follows. First, the input query values that are to be used can be received, for example from an accounting program that tracks whether invoices are overdue. Assume, in this example, that the received input query values are those discussed above with regard to the database table 200, namely Company X, G2, and Consultant Y. First, there can be run a query on the database table 200 that includes each of these input query values. In some implementations, this means that such a query seeks any entries in the table 200 whose values for the respective categories match each of those input query values.

Here, none of the rows 206 match those values. The metadata table 202 can then be consulted to determine which of the input query values to eliminate when revising the query. First, the column 212 indicates which categories belong to the respective groups 1 and 2. In this implementation, this means that the elimination process will begin with formulating a query by using the values in the group 1, and by not using the values in group 2 (i.e., by presently eliminating these values). Here, that can be accomplished by a query that reads (Company X, "*", and Consultant Y), where the asterisk indicates the unspecified value. Particularly, the value G2 for Customer Group is here eliminated because it belongs to group 2, unlike the other two values which belong to group 1. In some implementations, this formulation of the revised query means that the revised query is seeking any entries in the database table 200 that have the values Company X and Consultant Y in the respective categories, and that does not specify a value for the Customer Group category. For example, the revised query can seek any rule for handling of overdue invoices that is specific to the Company X and to the Consultant Y, but that is not specific as to the Customer Group involved. Here, there is one row in the table 200 (row 206*a*) that does not specify a value for the Customer Group category—indicated by this row having an asterisk instead of a value in that category. But this row does not meet the other requirements of the revised query, so the query does not find a match.

The first revised query can then be revised, for example according to the specifications in the metadata table 202. Here, the other value in group 1 has sequence number 0, so this value is not part of the elimination process. For example, this can mean that the elimination process will go through the values in the first group, except the one(s) with sequence number 0, and run revised queries accordingly, until a match is found. If no match is found after processing the first group, the elimination process can begin processing the second group. Here, this means that the elimination of the G2 value is the only elimination processing to be done for the group 1.

Next, the processing can then turn to group 2. In so doing, the value(s) that are part of group 1 can then, in some implementations, be treated as the group 2 values were in the processing of the group 1. That is, the group 1 values can be replaced with asterisks in the query, and the values from group 2 can be fully specified, at least in a first iteration of the group 2 processing. Here, this means that the query reads (Company X, G2, "*"). Namely, the Company X and the G2 values are included because the Company and Customer Group categories are included in group 2. The Business Partner is unspecified because this category is part of group 1. Thus, this further revised query can be performed on the table 200. Here, the query does not find a match because none of the entries in the table match those requirements.

The query can then be further revised, for example using the metadata table 202. Here, the table 202 specifies that the Customer Group category is the first value to be eliminated in the group 2. This value is G2 in the current example. Accordingly, the query can be revised to (Company X, "*", "*") by eliminating the G2 value. In some implementations, this query seeks entries in the table 200 that are specific to the Company X and that are explicitly unspecified as to the Customer Group and the Business Partner. Here, there are no entries in the table 200 that meet these requirements.

The query can then be further revised, for example using the metadata table 202. Particularly, the processing of the group 2 can continue with the elimination of the Company value, because this category has sequence number 2 for the group 2 in the column 214. The query can therefore be revised to ("*", "*", "*") In some implementations, this query seeks a rule for handling an overdue invoice which rule is not specific to any company, customer group or business partner, and can be considered a default rule.

Upon performing this query on the table 200, then, it can be determined that the row 206*a* meets the requirements of the query. That is, the row 206*a* has asterisks for each of the categories as specified by this revised query. The row 206*a* therefore matches the query, and the corresponding rule can be identified. For example, the row 206*a* here has a configuration bundle CB1 in the column 204 that can then be used upon finding the match. This configuration bundle can for example specify a particular action or actions to perform (or that no action is to be performed) in the situation that is at hand. The row 206*a* can be considered a default rule because it does not specify any values but rather contains only asterisks.

In some implementations, the processing of the input query values (optionally organized in groups) can be arranged so that if no match is found in the database after revising the query according to the specified eliminations, the final query should be an entirely unspecified query (e.g., containing only asterisks) so as to ensure that a default rule (e.g., the row 206*a*) can be found, if it is present in the table. Moreover, in some implementations the metadata table is configured so that no input query value can be excepted from elimination in the last group to be processed. For example, this can provide that when the final group is being processed, the elimination finally results in the fully unspecified query, because none of the values in the group are excepted from the elimination, and all values outside the group are held unspecified according to the group-based processing.

FIG. 3 shows an example of a method 300 that can be performed on sequence groups. For example, the method can be performed by a processor executing instructions stored in a computer-readable medium. In some implementations, the method 300 corresponds to the overall processing of groups of input query values, while the individual processing within such a group can be specified elsewhere. The method 300 can begin in step 302 with processing a first sequence group. This can involve processing the group 1 as defined by the metadata table 202 (FIG. 2). For example, the values of another group can be kept unspecified in the query in step 302. If an entry has been found in step 304, the method 300 can be terminated in an end node 306.

If, in contrast, the processing of the first group does not lead to a match, a second sequence group can be processed in step 308. For example, this can involve processing the group 2 as defined by the metadata table 202, while keeping the values of the group 1 unspecified (e.g., as asterisks). If an entry has been found in step 310 the method 300 can be terminated in the end node 306.

If, in contrast, the processing of the second group does not lead to a match, any subsequent group(s) can be processed in a similar way. For example, as each of the subsequent groups is processed the values of the other groups can be kept unspecified. If a match is found in processing any of the groups, this can cause termination of the method 300 at the node 306.

A final group number N can be processed in a step 312. In the processing of this group, then, the outcome may be that a match is found for some specified input query value(s) within this group, in which case the method can go to the node 306. As another example, the processing of the last group can ultimately lead to the formulation of a default query (such as an entirely unspecified query) that is known to have a match in the database table. In other implementations, there may not be a default query at the end (or no default entry in the database), and in such situations the outcome of the processing may be that no match can be found.

Figure 4:
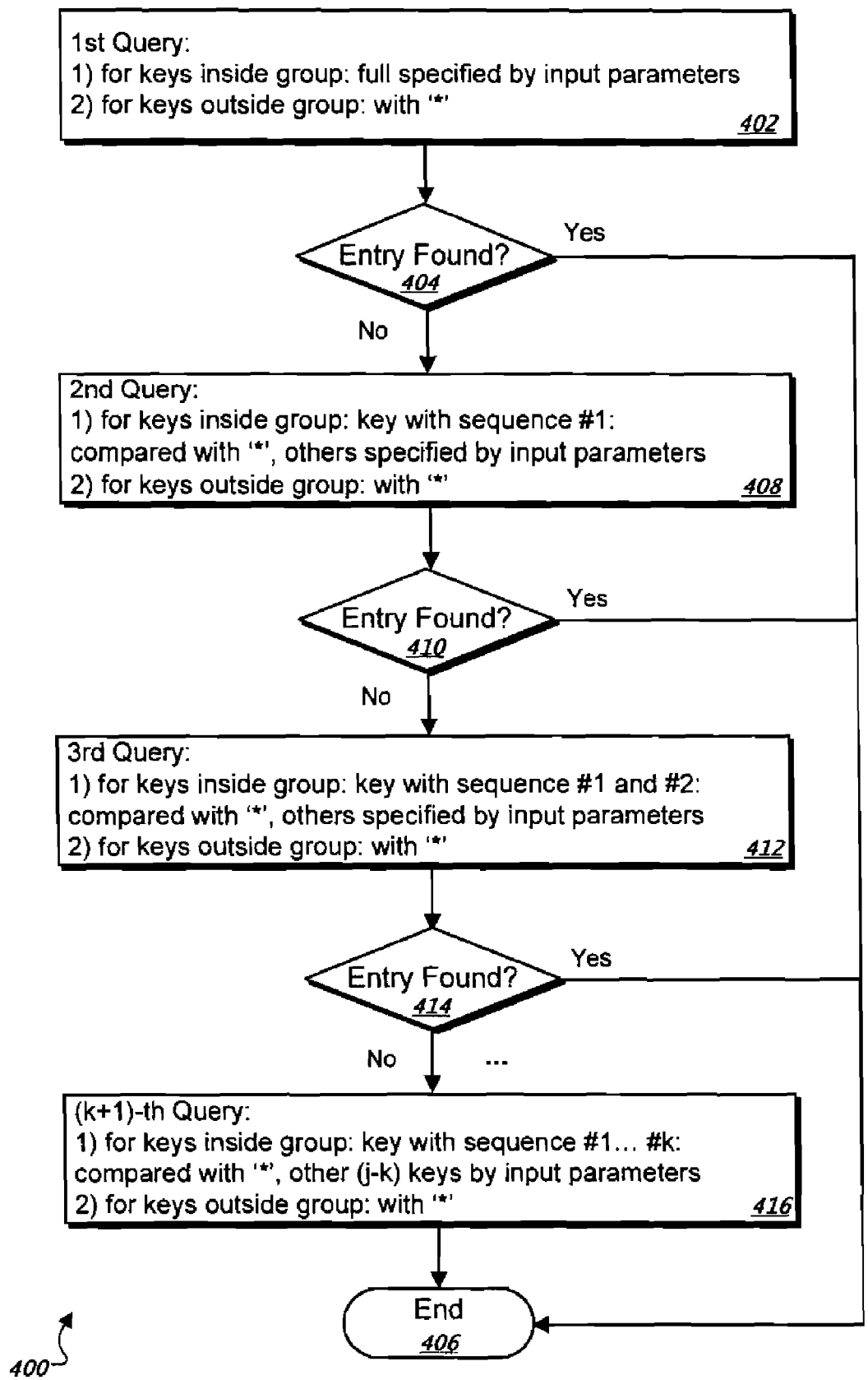
FIG. 4 shows an example of a method that can be performed on entries within a sequence group.

FIG. 4 shows an example of a method 400 that can be performed on entries within a sequence group. For example, the method 400 can be performed by a processor executing instructions stored in a computer-readable medium. In some implementations, the method 400 corresponds to the processing of input query values that relative to each other are not categorized into different groups, such as the values that belong to the same group. For example, some or all of the steps in the method 400 can be part of any or all of the steps 302, 308 or 312 (FIG. 3).

The method 400 can begin in step 402 with performing a first query. For categories within the group, the query can be fully specified with their values. For categories outside the group, the query can contain asterisks instead of their values. If an entry has been found in step 404, the method 400 can be terminated in an end node 406.

If, in contrast, the processing of the first query does not lead to a match, a second query can be processed in step 408. For categories outside the group, the query can contain asterisks instead of their values, as in the first query. For categories within the group, however, the query can be fully specified with their values except for the category that has sequence number 1. That input query value, then, can be replaced by an asterisk. If an entry has been found in step 410, the method 400 can terminate in an end node 406.

If, in contrast, the processing of the second query does not lead to a match, a third query can be processed in step 412. As in the first and second queries, the third query can contain asterisks instead of the values for categories outside the group. For categories within the group, however, the query can now contain asterisks for the categories that have sequence numbers 1 and 2, and for the other(s) it can have the input value(s). If an entry has been found in step 414, the method 400 can be terminated in the end node 406.

If, in contrast, the processing of the third query does not lead to a match, the processing can continue in an analogous way, with successive queries interspersed by revisions being performed. Assuming that there are a total of j fields in the sequence group, and that k of these fields have nonzero sequence numbers, it then follows that j-k of the fields have sequence number 0. As noted above, the sequence number 0 can have a special meaning, such as to be exempt from the elimination. In such an example, then, it follows that there can be at most k+1 process steps for this group, assuming that exactly one field is eliminated per step (in some implementations, several fields can be eliminated together). Accordingly, the method 400 in such an example can eventually reach a step 416, where a (k+1)th query is performed.

For the (k+1)th query, then, all the values that have nonzero sequence numbers can be unspecified (e.g., represented by asterisks), and all the values whose sequence numbers are 0 can be specified. Outside the group, all values can be unspecified, in analogy with the previous processing steps. If a match is found for this query, the method can be terminated and an appropriate action (or no action) be taken at the node 406. If no match is found, the method can also terminate and an exception be raised. As another example, processing for another group can be initiated, for example by starting the method 400 over for that next group. This, then, can correspond to going from the step 302 (FIG. 3) to the step 308, to name one example.

FIG. 5 shows an example of access coding 500 that can be used in querying a database. For example, one or more portions of this coding can be executed after a fully specified query does not find a match in a particular database. The access coding can be stored in a computer-readable medium for execution by a processor. For example, the coding in this example is written in ABAP, the programming language introduced by SAP AG In other implementations, the coding can be written in another programming or query language.

A first code portion 502 can relate to the processing of a first group and a second code portion 504 can relate to the processing of a second group. For example, these portion can be analogous to the respective step 302 and step 308 in FIG. 3. Within code portion 502, a first portion 506 can relate to performing a query where a customer group value is unspecified and other values, such as company and business partner, are specified with their input values. A second code portion 508 specifies that the execution of the first code portion 502 can be interrupted if an entry is found. A third code portion 510 in the first code portion 502 can relate to performing another query where the company and customer group values are unspecified and other values, such as a business partner, are specified with their input values. A fourth code portion 512 specifies that the execution of the first code portion 502 can be interrupted if an entry is found.

If no match is found in the processing according to the first code portion 502, execution of the second code portion 504 for the second group can be commenced. Here, a first code portion 514 can define a query to be performed in which the company and customer group values are specified, and any other values such as the business partner are unspecified. If a match is found, the process can exit according to a second code portion If no match is found, the processing can continue with one or more elimination steps and corresponding queries.

A third code portion 518, then, can specify a default query in which all input query values are unspecified. That is, this query seeks an entry in the database that is not limited to a specific value for any of the categories. If a (default) match is found, the process can exit according to a fourth code portion 520. For example, the match to the default entry can cause the system to execute a default action in response to the input query values. By contrast, if the default query finds no match, an exception can be raised according to a fifth code portion 522. For example, the exception can trigger a predefined output to be made or an exception routine to be performed.

Figure 6:
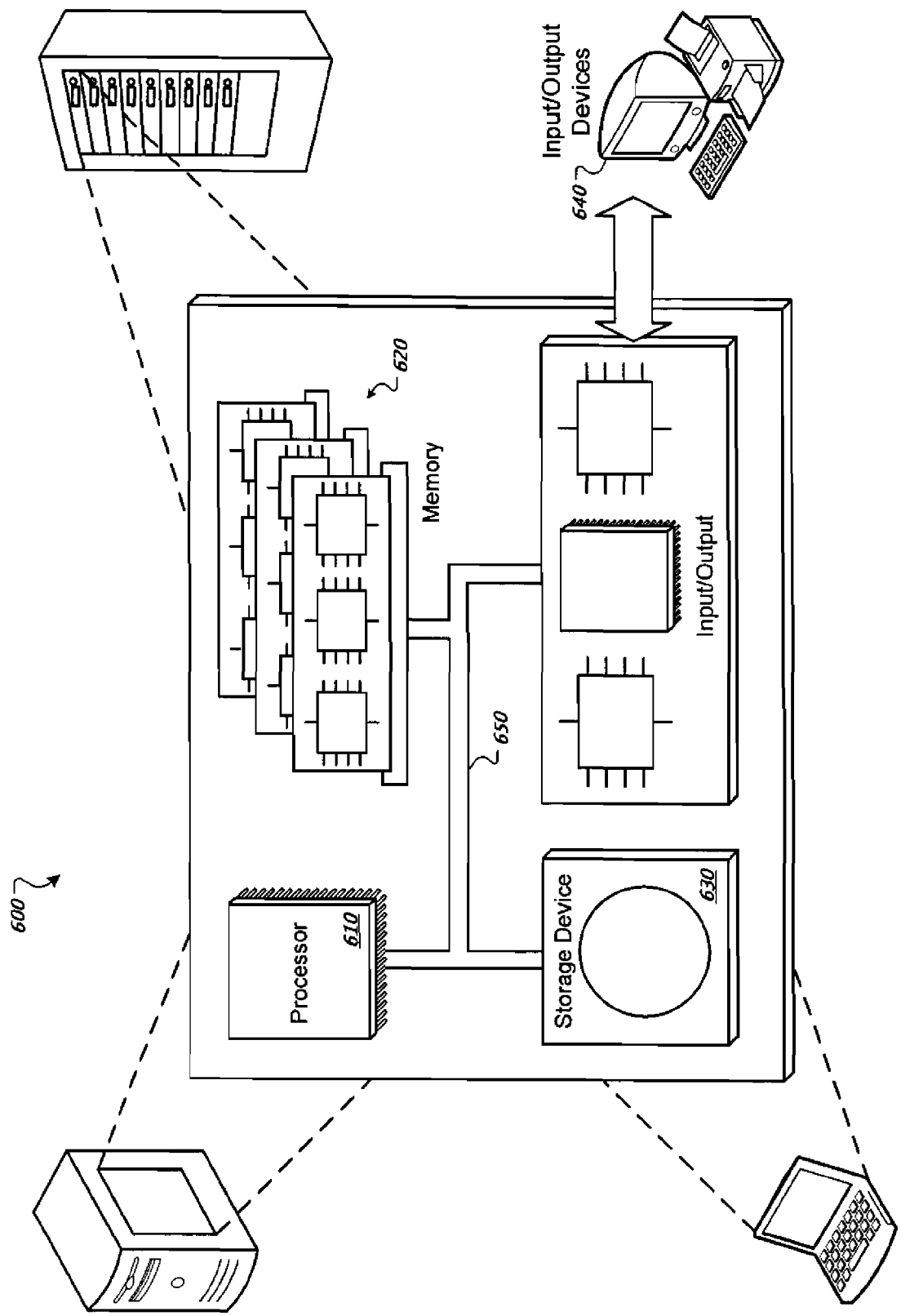
FIG. 6 is a block diagram of a computing system that can be used in connection with computer-implemented methods described in this document.

FIG. 6 is a schematic diagram of a generic computer system 600. The system 600 can be used for the operations described in association with any of the computer-implement methods described previously, according to one implementation. The system 600 includes a processor 610, a memory 620, a storage device 630, and an input/output device 640. Each of the components 610, 620, 630, and 640 are interconnected using a system bus 650. The processor 610 is capable of processing instructions for execution within the system 600. In one implementation, the processor 610 is a single-threaded processor. In another implementation, the processor 610 is a multi-threaded processor. The processor 610 is capable of processing instructions stored in the memory 620 or on the storage device 630 to display graphical information for a user interface on the input/output device 640.

The memory 620 stores information within the system 600. In one implementation, the memory 620 is a computer-readable medium. In one implementation, the memory 620 is a volatile memory unit. In another implementation, the memory 620 is a non-volatile memory unit.

The storage device 630 is capable of providing mass storage for the system 600. In one implementation, the storage device 630 is a computer-readable medium. In various different implementations, the storage device 630 may be a floppy disk device, a hard disk device, an optical disk device, or a tape device.

The input/output device 640 provides input/output operations for the system 600. In one implementation, the input/output device 640 includes a keyboard and/or pointing device. In another implementation, the input/output device 640 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device or in a propagated signal, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of embodiments of the invention have been described. Nevertheless, it will be understood that various modifications may be made without departing from the spirit and scope of the invention. Accordingly, other embodiments are within the scope of the following claims.

What is claimed is:

1. A computer-implemented method for performing a query for rules in a database, the method being performed by a processor executing instructions from a computer readable storage medium, the method comprising:

generating, in a computer system, a value vector that corresponds to a factual situation, the value vector having vector positions each corresponding to a respective category of multiple categories, wherein each of the vector positions includes one of: (i) a vector value for the corresponding category; and (ii) a no value specified indicator;

performing a first query based on the value vector in a database whose entries contain rules configured for computer-based evaluation, each of the rules having rule positions each corresponding to a respective category of the multiple categories, wherein each of the rule positions includes one of: (i) a rule value for the corresponding category; and (ii) the no value specified indicator;

wherein the first query is performed so that a rule is responsive to the first query only if (i) the rule has a matching value in each category for which the value vector has a vector value and (ii) the rule has the no value specified indicator in each category for which the value vector has the no value specified indicator;

identifying, upon no rule responsive to the first query being found, at least one of the categories for which to replace the associated vector value from the first query with the no value specified indicator; and performing at least one subsequent query in the database so that a rule is responsive to the second query only if (i) the rule has a matching value in each category for which the first query has a vector value, except for the identified at least one category, and (ii) the rule has the no value specified indicator in each category for which the first query has the no value specified indicator and also in the identified at least one category;

wherein as long as no responsive rule is found, another subsequent query is performed where the no value specified indicator replaces another vector value, at most until a rule containing only the no value specified indicators is found using a query containing only the no value specified indicators.

2. The method of claim 1, wherein vector values for the first query were identified in a by replacing a vector value from a previous query that did not result in a match, the vector value being replaced with the no value specified indicator for at least one category that was involved in the previous query.

3. The method of claim 1, wherein the at least one category is identified by accessing a sequence record indicating an order in which to replace vector values for at least some of the categories.

4. The method of claim 3, wherein the sequence record contains an indication that at least one of the categories is not to be subject to vector value replacement.

5. The method of claim 4, wherein the sequence record defines category groups that are to be processed in order until a match is found, and wherein the indication can be included in each of the category groups except a last category group.

6. The method of claim 5, wherein the last category group is being processed, further comprising generating a last query by replacing a vector value for a last one of the categories, wherein a rule is responsive to the last query only if the rule has the no value specified indicator for each of the categories.

7. The method of claim 1, further comprising:
receiving, before generating the value vector, an overall group of values;
identifying the vector values in the overall group for use in the first query based on a predefined assignment of the vector values to a first group; and
identifying at least another one of the categories with which at least another vector value in the overall group is associated, the at least one other vector value having a predefined assignment to a second group;
wherein the rule is responsive to the first query only if the rule also has the no value specified indicator for the at least one other category identified for the second group.

8. The method of claim 7, wherein successive queries for the vector values of the first group are performed, interspersed with at least one vector value replacement, without a match being found, further comprising processing the other vector values of the second group in a corresponding way until a match is found.

9. The method of claim 1, wherein each of the rules is associated with an action, further comprising performing the associated action upon the rule being responsive to any query.

10. The method of claim 1, wherein the first and second queries are performed on at least one configuration table in the database, and wherein the entries are rows in the configuration table.

11. A computer program product tangibly embodied in a computer readable storage medium and comprising instructions that when executed by a processor perform a method for performing a query for rules in a database, the method comprising:
generating, in a computer system, a value vector that corresponds to a factual situation, the value vector having vector positions each corresponding to a respective category of multiple categories, wherein each of the vector positions includes one of: (i) a vector value for the corresponding category; and (ii) a no value specified indicator;
performing a first query based on the value vector in a database whose entries contain rules configured for computer-based evaluation, each of the rules having rule positions each corresponding to a respective category of the multiple categories, wherein each of the rule positions includes one of: (i) a rule value for the corresponding category; and (ii) the no value specified indicator;
wherein the first query is performed so that a rule is responsive to the first query only if (i) the rule has a matching value in each category for which the value vector has a vector value and (ii) the rule has the no value specified indicator in each category for which the value vector has the no value specified indicator;
identifying, upon no rule responsive to the first query being found, at least one of the categories for which to replace the associated vector value from the first query with the no value specified indicator; and
performing at least one subsequent query in the database so that a rule is responsive to the second query only if (i) the rule has a matching value in each category for which the first query has a vector value, except for the identified at least one category, and (ii) the rule has the no value specified indicator in each category for which the first query has the no value specified indicator and also in the identified at least one category;
wherein as long as no responsive rule is found, another subsequent query is performed where the no value specified indicator replaces another vector value, at most until a rule containing only the no value specified indicators is found using a query containing only the no value specified indicators.

12. A computer program product tangibly embodied in a computer readable storage medium, the computer program product including:
a database whose entries contain rules configured for computer-based evaluation, each of the rules having rule positions each corresponding to a respective category of multiple categories, wherein each of the rule positions includes one of: (i) a rule value for the corresponding category; and (ii) a no value specified indicator, the database configured to be queried based on a value vector having vector positions each corresponding to a respective category of the multiple categories;
wherein each of the vector positions includes one of: (i) a vector value for the corresponding category; and (ii) the no value specified indicator, and one of the rules contains only the no value specified indicators; and
a data structure that is configured to indicate an order that vector values for at least some of the multiple categories will be replaced with the no value specified indicator when generating a new query after a previous query does not result in a match among the entries of the database, wherein a rule is responsive to the new query only if (i) the rule has a matching value in each category for which the earlier query has a vector value, except for the at least one category where the vector value is replaced, and (ii) the rule has the no value specified indicator in each category for which the earlier query has the no value specified indicator and also in the identified at least one category where the vector value is replaced.

13. The computer program product of claim 12, wherein the data structure defines category groups that are to be processed in order until a match is found.

14. The computer program product of claim 12, wherein during the processing of one of the category groups the vector values for the categories in any currently not processed category group are replaced with the no value specified indicator.

15. The computer program product of claim 12, wherein the data structure further contains an indication that at least one of the categories is not to be subject to vector value replacement.

16. The computer program product of claim 15, wherein the data structure defines category groups that are to be processed in order until a match is found, and wherein the indication can be included in each of the category groups except a last category group.

17. The computer program product of claim 12, wherein each of the is associated with an action that can be performed, the associated action to be performed upon the rule being responsive to any query.

18. The computer program product of claim 12, wherein the first and second queries are performed on at least one configuration table in the database, and wherein the entries are rows in the configuration table.

* * * * *